(12) United States Patent
Alshowkan et al.

(10) Patent No.: US 12,425,202 B2
(45) Date of Patent: Sep. 23, 2025

(54) AUTHENTICATION OF SMART GRID COMMUNICATIONS USING QUANTUM KEY DISTRIBUTION

(71) Applicant: UT-Battelle, LLC, Oak Ridge, TN (US)

(72) Inventors: Muneer Alshowkan, Oak Ridge, TN (US); Philip G. Evans, Clinton, TN (US); Michael Starke, Knoxville, TN (US); Nicholas A. Peters, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 185 days.

(21) Appl. No.: 18/478,376

(22) Filed: Sep. 29, 2023

(65) Prior Publication Data
US 2024/0113870 A1    Apr. 4, 2024

Related U.S. Application Data

(60) Provisional application No. 63/411,646, filed on Sep. 30, 2022.

(51) Int. Cl.
    *H04L 9/08*    (2006.01)
(52) U.S. Cl.
    CPC .......... *H04L 9/0858* (2013.01); *H04L 9/0869* (2013.01)
(58) Field of Classification Search
    USPC ....................................................... 713/171
    See application file for complete search history.

(56) References Cited

U.S. PATENT DOCUMENTS

2018/0109372 A1* 4/2018 Fu ........................... H04L 9/083
2023/0020193 A1* 1/2023 Williams .............. H04L 9/0825

FOREIGN PATENT DOCUMENTS

WO    WO-2022038640 A1 * 2/2022 ............. G06F 7/588

OTHER PUBLICATIONS

Evans, P. et al., "Trusted Node QKD at an Electrical Utility", IEEE Access, 2021, pp. 105220-105229, vol. 9 (Year: 2021).*
Evans, P. et al., "Trusted Node QKD at an Electrical Utility", IEEE Access, 2021, pp. 105220-105229, vol. 9.
Dynes, J. et al., "Cambridge quantum network", npj Quantum Information, 2019, pp. 1-8, vol. 5, No. 101.
Alshowkan, M. et al., "Advanced architectures for high-performance quantum networking", J. Opt. Commun. Netw., Jun. 2022, pp. 493-499, vol. 14, No. 6.
Choi, I. et al., "Field trial of a quantum secured 10Gb/s DWDM transmission system over a single installed fiber", Opt. Express, 2014, pp. 1-8, vol. 22, No. 19.

* cited by examiner

*Primary Examiner* — Sanchit K Sarker
(74) *Attorney, Agent, or Firm* — Scully, Scott, Murphy & Presser, P.C.

(57) ABSTRACT

Systems, methods, and computer-readable programs are provided for authentication of unencrypted message(s) transmitted between two devices of a power grid over a public communications network are provided. The authentication uses a quantum-based secret key and an initialization vector generated from a quantum random number to generate a payload for a transmission packet. The quantum-based secret key is shared between the transmitting device and the receiving device. When the receiving device receives the packet, the receiving device uses the shared quantum-based secret key and the initialization vector to verify whether the payload in the packet is authentic.

37 Claims, 15 Drawing Sheets

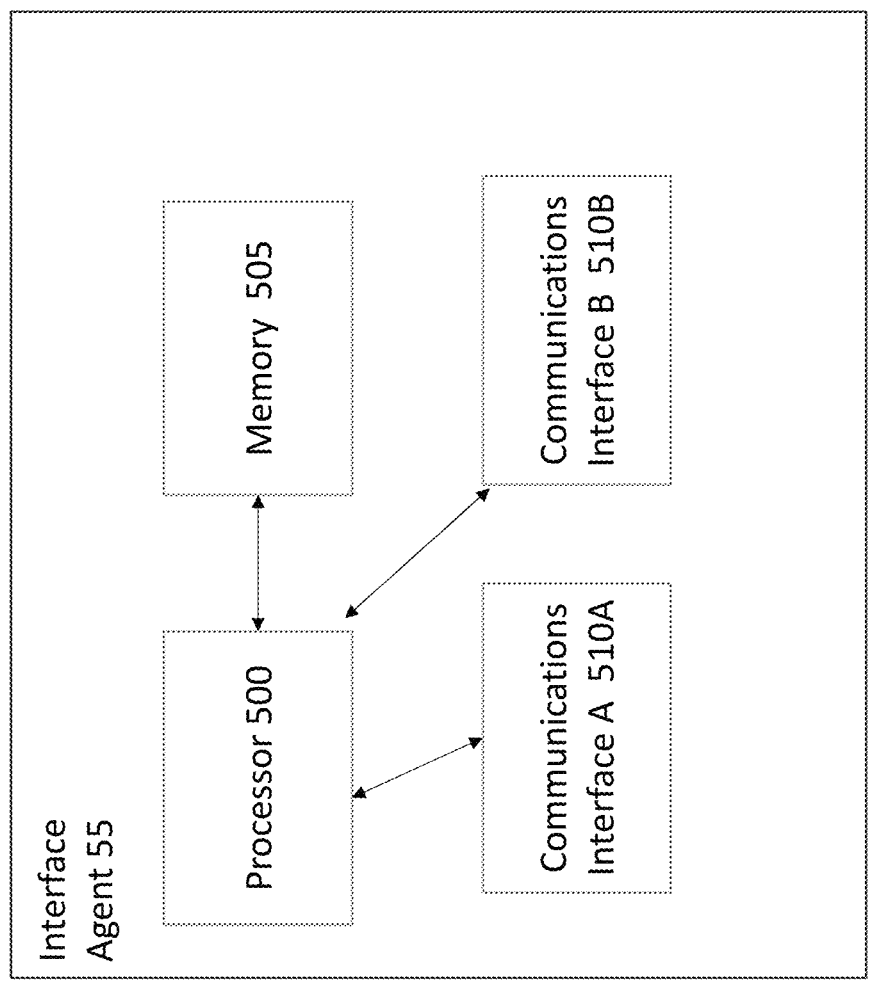

Fig. 6

```
Algorithm 1 Create MAC for each outgoing message
  Input: message, topic
  Output: payload
  function PUBLISH(message)
    m ← message
    t ← topic
    n ← number of msg secret key
    c ← c / timestamp
    rm ← m + t + c + # + # + #
    key ← the nth secret key from key table
    r ← msg random number from QRNG
    msag ← CMAC(rm,key,k+)
    p ← rm + tn + msacs
    return p
  end function
```

Fig. 8

Sync 800: Two values to determine the start of a frame

Key ID 805: 64 bits key counter

Key Data 810: Secret key 256-bits

Key Status 815: 1 bit status if usable or not

CRC 820: 32-bit for key id, key, and status

Fig. 10

Dashboard 1300

AUTHENTICATION OF SMART GRID COMMUNICATIONS USING QUANTUM KEY DISTRIBUTION

CROSS-REFERENCE TO RELATED APPLICATIONS

This application claims the benefit of U.S. Provisional Application No. 63/411,646, filed on Sep. 30, 2022, which is incorporated by reference herein in its entirety.

STATEMENT REGARDING FEDERALLY SPONSORED RESEARCH OR DEVELOPMENT

This invention was made with Government support under DE-AC05-00OR22725 awarded by US Department of Energy. The Government has certain rights to this invention.

FIELD OF THE DISCLOSURE

This disclosure relates to communications between two locations of a utility system using a public network. More particularly, the disclosure relates to systems and methods for securely communicating unencrypted payloads between the two locations.

BACKGROUND

Automation controllers are used in many different types of information technology systems such as in a utility system. A utility system may have portions located in different substations and distribution centers facilities. The automation controller, such as a real-time automation controller (RTACs) serves as protocol aggregation, analysis, and coordination. The RTACs typically control other components such as programmable logic controllers (PLCs), which may be part of distributed energy resources (DERs).

A typical utility system may comprise one or more monitoring devices at one or more substation. An operator/user ("operator") can monitor the overall system's operation via a dashboard on the monitoring devices, such as a computer (human-machine interface) (HMI).

The substations may be in communication with the distribution centers via a network. This network may be a public network. The substation may also be connected to an electric grid of the utility via a transformer.

The distribution centers are the portion of the utility system which produces the energy, e.g., electricity, for the electric grid. The electric grid may comprise an electrical network composed primarily of large, centralized fossil fuel plants. The electric grid may also comprise renewable and energy storage type plants such as Wind, photovoltaic (PV), and energy storage (ES). These electric grid(s) may be able to produce hundreds of kilowatts(kW) to megawatts (MWs) of potential power generation.

The electric grid is comprised of multiple resources. The resources may be connected via a network (which may be private or public). Electric grid is controlled, in part, by one of the RTAC such as a supervisory control and data acquisition (SCADA) controller which is part of a SCADA system. The SCADA controller(s) communicates with the resources (DERs) to establish operational capabilities and optimization strategies.

The resources comprise sensors, actuators, the DERs (which produce or storage the energy). Many of the resources support several operational modes and communications protocols via an integrated communications module. SCADA system includes a SCADA controller, a human-machine interface (HMI), a communications network, a master terminal unit (MTU), remote terminal units (RTUs), and field devices. The SCADA communications network enables connectivity between the SCADA system constituents. Certain components of the SCADA system are in the substation while others are in the distribution center.

The remote locations of the various components led to the development of many different communications protocols. Some protocols have been designed to consider the processing power and communications requirements of industrial applications, while others focused on speed. However, many protocols were designed without integrated security services such as authentication and encryption. Consequently, communications in these models are vulnerable to cyberattacks. For instance, conventional ethernet-based SCADA communication protocols such as DNP3, EtherCat, Powerlink, Foundation Fieldbus HSE, and Modbus do not offer any authentication security mechanism. On the other hand, other conventional ethernet-based SCADA communication protocols such as DNS3-SA, IEC-60870, IEC-61850, and PROFINET implement security measures based on digital signatures.

The SCADA system may include (1) monolithic systems that are isolated and do not interact with one another, (2) distributed systems that communicate over a local area network (LAN), (3) networked systems that operate in multiple sites and communicate over a wide area network (WAN), and (4) Internet of things (IoT) systems that are connected to cloud computing for widescale implementation and computational resource availability.

SCADA systems have been the target of many attacks that can impact the reliability of the communications network. These attacks include eavesdropping, man-in-the-middle, masquerade, virus and worms, trojan horses, and denial-of-service. These attacks have targeted various levels of the SCADA network including the application layer, session layer, network transport layer, data link layer, and physical layers, with varying success rates. Communication over a public network makes the communications particularly susceptible to attacks.

To reduce the risk of an attack, certain utility systems employ encryption and authentication. Both encryption and authentication schemes use cryptographic algorithms and secret keys.

Currently, many popular cryptographic solutions, such as public-key cryptography, are based on hard-to-solve mathematics using assumptions based on potentially available computing resources. One of the major advantages of public-key cryptography is enabling messages to be encrypted and/or authenticated with a "public" key, e.g., known to all, which in turn can only be decrypted and/or signed with a "private" key, e.g., kept secret. The generation of the public-private key pair leverages the aforementioned mathematics. To continually improve security of this type of cryptography, the secret key size must increase with available computational capabilities. This can be a challenge for devices deployed in the field as the availability of computational resources, e.g., memory size and processing capability, is typically fixed during deployment or when the device is constructed. Hence, without detrimentally increasing latency or potentially being put out of service—as the processing demand increases—devices in the field must be replaced.

However, given the number of messages sent in a SCADA system, there is a need to quickly process the received messages to determine whether they are authentic.

SUMMARY

Accordingly, disclosed is a system for authenticating messages transmitted through a public network between devices of a power grid. The system comprises a first device and a second device of the power grid. The second device is spatially separated from the first device. The first device and the second device are communicatively coupled through the public network. The first device may comprise a memory configured to store a plurality of shared quantum-based secret keys received from a quantum key distribution (QKD) system and a plurality of values generated from quantum-based random numbers from a quantum-random number generator (QRND), respectively. The second device may also comprise a memory configured to store a plurality of shared quantum-based secret keys received from the QKD system. The first device is configured to select one of the plurality of values and produce an initialization vector from the selected quantum-based random number for a specific transmission, obtain at least one unencrypted message for transmission over the public network, select one of the plurality of stored shared quantum-based secret keys from memory and produce a sender challenge using the at least one unencrypted message, the selected quantum-based key and the produced initialization vector, and transmit, over the public network, a packet containing a payload that includes the at least one unencrypted message, the initialization vector, and the sender challenge. The second device is configured to receive, over the public network, the packet transmitted by the first device, produce a receiver challenge using the at least one unencrypted message and the initialization vector received in the payload, and a corresponding quantum-based secret key from among the stored shared quantum-based secret keys in the memory of the second device, verify whether the receiver challenge matches the sender challenge received in the payload, and if so indicate that the at least one unencrypted message received in the payload is authentic.

In an aspect of the disclosure, the system may further comprise the QKD system. A part of the QKD system is co-located with the first device and a part of the QKD system is co-located with the second device. The QKD system is configured to produce a plurality of quantum-based secret keys and share the plurality of quantum-based secret keys with the first device and the second device via a quantum channel.

In an aspect of the disclosure, the system may further comprise the QRNG. A part of the QRNG is co-located with the first device. The QRNG is configured to generate the quantum-based random numbers for the first device.

In an aspect of the disclosure, the produced quantum-based secret keys may comprise a first set of quantum-based secret keys and a second set of quantum-based secret keys. The first set of quantum-based secret keys may be used by the first device for transmission and the second set of quantum-based secret keys may be used by the second device for transmission.

In an aspect of the disclosure, a different shared quantum-based secret key and/or a different initialization vector may be used for each transmission of the packet.

In an aspect of the disclosure, multiple messages may be collectively transmitted as a group in the same packet. The collectively transmitted messages may have the same topic.

In an aspect of the disclosure, the payload may include an identifier of the selected quantum-based secret key. The second device may select the corresponding quantum-based secret key from the memory in the second device using the identifier in the payload.

In an aspect of the disclosure, the system may further comprise a server. The server may periodically receive from the first device and/or the second device at least one of a number of available quantum-based secret keys, a number of used quantum-based secret keys or a number of newly added quantum-based secret keys. The server may also periodically receive from the second device at least one of a number of successful authentications or a number of unsuccessful authentications.

In an aspect of the disclosure, the server may comprise a display. The display may display the at least one of a number of successful authentications or a number of unsuccessful authentications and the at least one of a number of available quantum-based random numbers, a number of used quantum-based random numbers or a number of newly added quantum-based random number.

In an aspect of the disclosure, when the number of available quantum-based random numbers in either the first device or the second device is below a threshold, the QKD system produces new quantum-based secret keys and shares the new quantum-based secret keys.

In an aspect of the disclosure, when a number of unsuccessful authentications exceeds a threshold, an investigation is triggered.

In an aspect of the disclosure, the payload may further comprise a timestamp. In this aspect, the second device may determine whether the payload is timely received at least based on the timestamp. When the payload is not timely received, an investigation is triggered.

In an aspect of the disclosure, each of the first device and the second device is configured to generate a message authentication code to produce the sender challenge and produce the receiver challenge and verify whether the receiver challenge matches the sender challenge.

In an aspect of the disclosure, the first device may be part of a first private network. The first private network may have two or more distributed energy resources (DER). The second device may be part of a second private network. The second private network may also have at two or more DERs. Each of the first private network may has a network encryption (NE) card such as a Firewall and encryption device (FED). The first device may be the NE card of the first private network and the second device may be the NE card of the second private network. The NE card of the first private network may receive over the first private network a message from a DER of the first private network and produce the payload from the message for authentication and transmit the packet containing the payload over the public network to the NE card of the second private network. The NE card of the second private network may receive the packet containing the payload over the public network, authenticate the payload and transmit the message over the second private network to at least one of the DERs or an administration device.

In an aspect of the disclosure, a DER may be electrical energy storage modules and photovoltaic (PV) modules and associated controller, respectively and a supervisory control and data acquisition (SCADA) controller.

In an aspect of the disclosure, the first device may receive the unencrypted message from another device or generate the unencrypted message.

In an aspect of the disclosure, the first device and the second device each is communicatively coupled through the public network to a broker system that implements a publish-subscribe message transmission technique, The first device may associate the unencrypted message with a topic and transmit the packet having the message and topic over the public network to the broker system for topic-based publication. The second device may receive the packet from the broker system over the public network. In this aspect, each of the first device and the second device is configured to implement, in conjunction with the broker system, the publish-subscribe message transmission technique using a message queuing telemetry transport (MQTT) protocol.

Also disclosed is a system for authenticating messages transmitted through a public network between devices of a power grid. The system may comprise a first device, a second device and a quantum random number generator (QRNG) subsystem. The first device and the second device of the power grid are spatially separated from each other and communicatively coupled through the public network. The first device is configured to access at least one quantum-based secret key produced by a quantum key distribution (QKD) system. The second device is also configured to access the at least one quantum-based secret key. The QRNG subsystem is collocated, at least in part, with the first device. The QRNG subsystem is configured to generate at least one quantum-based random number for the first device. The first device is configured to obtain an unencrypted message for transmission over the public network, produce an initialization vector for the transmission from one of the at least one quantum-based random number, produce a sender challenge using the unencrypted message, one of the at least one quantum-based secret key, and the produced initialization vector, and transmit, over the public network, a packet containing a payload that includes the unencrypted message, the initialization vector, and the sender challenge. The second device is configured to receive, over the public network, the packet transmitted by the first device, produce a receiver challenge using the unencrypted message and the initialization vector received in the payload, and a corresponding quantum-based secret key from among the at least one accessed quantum-based secret key, verify whether the receiver challenge matches the sender challenge received in the payload, and if so indicate that the unencrypted message received in the payload is authentic The same quantum-based secret key may be accessed by the first device and the second device at the same time.

In an aspect of the disclosure, the system may further comprise the QKD system. A part of the QKD system is co-located with the first device and a part of the QKD system is co-located with the second device. The QKD system is configured to produce the at least one quantum-based secret key and share the at least one quantum-based secret key with the first device and the second device via a quantum channel.

In an aspect of the disclosure, the first device and the second device may have access to multiple quantum-based secret keys, e.g., a plurality of quantum-based secret keys. The plurality of quantum-based secret keys comprises a first set of quantum-based secret keys and a second set of quantum-based secret keys. The first set of quantum-based secret keys may be used by the first device for transmission, and the second set of quantum-based secret keys may be used by the second device for transmission.

In an aspect of the disclosure, a different shared quantum-based secret key and/or a different initialization vector may be used for each transmission of the packet.

In an aspect of the disclosure, the payload may include an identifier of the quantum-based secret key. The second device may identify the corresponding quantum-based secret key using the identifier in the payload.

In an aspect of the disclosure, the system may further comprise a server. The server may periodically receive from the first device and/or the second device at least one of a number of available quantum-based secret keys, a number of used quantum-based secret keys or a number of newly added quantum-based secret keys. The server may also periodically receive from the second device at least one of a number of successful authentications or a number of unsuccessful authentications.

In an aspect of the disclosure, the server may comprise a display. The display may display the at least one of a number of successful authentications or a number of unsuccessful authentications and the at least one of a number of available quantum-based random numbers, a number of used quantum-based random numbers or a number of newly added quantum-based random number.

In an aspect of the disclosure, when the number of unsuccessful authentications exceeds a threshold, the server is configured to trigger an investigation, or an investigation is triggered.

In an aspect of the disclosure, the payload may further comprise a timestamp. In this aspect, the second device may determine whether the payload is timely received at least based on the timestamp. When the payload is not timely received, the second device may trigger and an investigation.

In an aspect of the disclosure, when the number of available quantum-based random numbers in either the first device or the second device is below a threshold, the QKD system produces at least one new quantum-based secret key and shares the at least one new quantum-based secret key. In an aspect of the disclosure, each of the first device and the second device is configured to generate a message authentication code to produce the sender challenge, and produce the receiver challenge and verify whether the receiver challenge matches the sender challenge. In an aspect of the disclosure, the first device may be part of a first private network. The first private network may have two or more distributed energy resources (DER). The second device may be part of a second private network. The second private network may also have at two or more DERs. Each of the first private network may has a network encryption (NE) card such as a Firewall and encryption device (FED). The first device may be the NE card of the first private network and the second device may be the NE card of the second private network. The NE card of the first private network may receive over the first private network a message from a DER of the first private network and produce the payload from the message for authentication and transmit the packet containing the payload over the public network to the NE card of the second private network. The NE card of the second private network may receive the packet containing the payload over the public network, authenticate the payload and transmit the message over the second private network to at least one of the DERs or an administration device.

In an aspect of the disclosure, a DER may be electrical energy storage modules and photovoltaic (PV) modules and associated controller, respectively and a supervisory control and data acquisition (SCADA) controller.

In an aspect of the disclosure, the first device may receive the unencrypted message from another device or generate the unencrypted message.

In an aspect of the disclosure, the first device and the second device each is communicatively coupled through the public network to a broker system that implements a publish-subscribe message transmission technique, The first device may associate the unencrypted message with a topic and transmit the payload having the message and topic over the public network to the broker system for topic-based publication. The second device may receive the payload from the broker system over the public network. In this aspect, each of the first device and the second device is configured to implement, in conjunction with the broker system, the publish-subscribe message transmission technique using a message queuing telemetry transport (MQTT) protocol.

BRIEF DESCRIPTION OF THE DRAWINGS

FIG. 5A illustrates a block diagram of a SCADA in accordance with aspects of the disclosure and FIG. 5B illustrates a block diagram of an interface agent in accordance with aspects of the disclosure;

FIG. 6 illustrates a method of generating a payload of a message for transmission over a public network in accordance with aspects of the disclosure;

FIG. 8 illustrates examples of the quantum keys which may be stored in memory in accordance with aspects of the disclosure, with annotation of the format;

FIG. 10 illustrates a method for verifying an incoming message in accordance with aspects of the disclosure;

DETAILED DESCRIPTION

In accordance with aspects of the disclosure, instead of encrypting the contents of a message, e.g., a payload, using a secret key and subsequently decrypting the message when it is received, a private key such as a quantum key is used to create a code which is sent along with the contents of the message (included in the payload) which is used for verification. This enables a packet containing the payload to be securely sent over a public network and be efficiently verified without the need to encrypt the payload. The quantum keys are shared by a quantum key distribution (QKD) system in advance with a transmission device and a reception device or at the same time such as on-demand or as needed.

Figure 1:
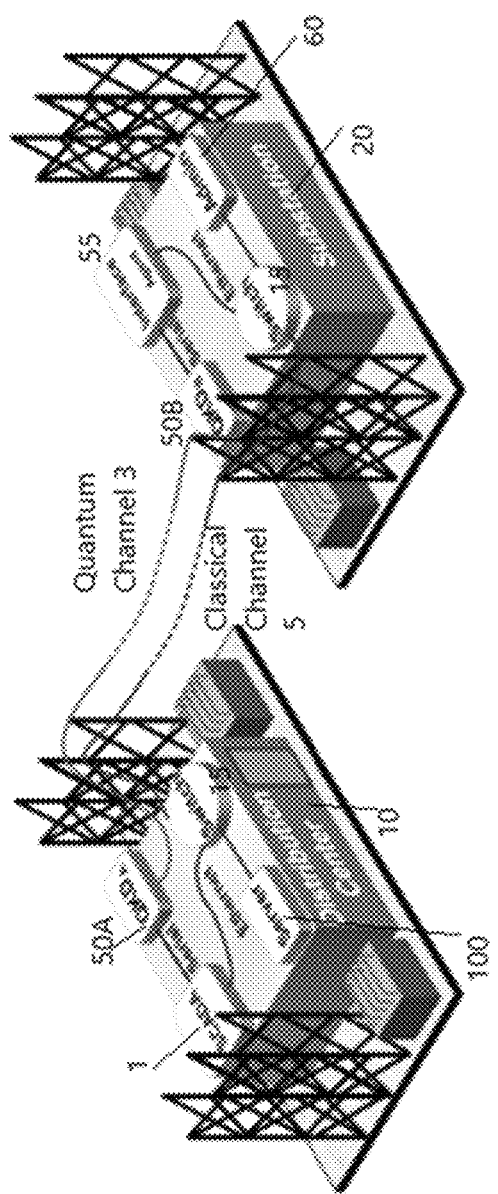
FIG. 1 illustrates an example of an authentication system at a distribution center and a substation in accordance with aspects of the disclosure.

FIG. 1 illustrates an example of an authentication/verification system for authentication/verification of communication between two remotely located sub-systems in a utility system. The terms "authentication" and verification are used interchangeably in this disclosure. As shown in FIG. 1, the communications may be between a distribution center 10 and a substation 20 of the utility system. However, the communications may be between two distribution centers 10 of the utility system or two substations 20 of the utility system.

Communications occur using a quantum channel 3 and a classical channel 5. The quantum channel 3 may be a dedicated channel used for the sharing of the quantum keys 700. The sharing of the quantum key 700 also include some communication over the classical channel 5 to verify the quantum keys 700 (in this case, the classical channel may be secured in advance for the exchange of information related to the quantum keys). The quantum channel 3 may be formed from two optical fiber cables. The optical fiber cables may be above-ground such as shown in FIG. 1. However, in other aspects, the optical fiber cables may be in-ground to avoid environmental factors. The environmental factors may include temperature changes and wind motion. These factors may impact the quantum key generation rate. The longer the distance between the distribution center 10 and a substation 20, the greater the impact that the environment factors may have on the rate.

The communications via the quantum channel 3 may be isolated from communications via the classical channel 5.

In an aspect of the disclosure, the classical channel 5 may also be formed by optical fiber cables. In some aspects, while the communications may be isolated, the optical fiber cables used for the classical channel 5 may be bundled with the optical fiber cables used for the quantum channel 3.

In some aspects, when a fiber optic cable is used, the length may be in a range of 1-10 km. In some aspects, the length may be less than 20 km. In some aspects, the length may be less than 1 km. In some aspects, the length may be less than 50 km. However, the longer the cable length, the higher the attenuation is. For example, an optical fiber cable length between distribution center 10 and a substation 20 of approximately 3.4 km could exhibit an optical attenuation of 1.3 dB at 1550 nm, including patch panel connectors and splices. In some aspects, for longer distances, quantum repeaters may be used. In other aspects, for longer distances satellites may be used.

In other aspects, the quantum channel 3 may be a free-space link ("fiberless"). However, physical objects and weather may impact the communications path.

In other aspects, the classical channel 5 may be also a free-space link. The free-space link may use a wireless protocol such as Wi-Fi®. In other aspects, the classical channel 5 may be a Cu-wire connection.

Alternatively, the same link, such as the same optical fiber cable may be used for both the quantum channel 3 and the classical channel 5, however, the presence of much high power classical optical signals on the same fiber as the quantum signals may introduce a considerable amount of noise in the quantum channel 5.

The classical channel 5 is public (public network) and may be vulnerable to cyberattacks. Thus, in accordance with aspects of the disclosure, the distribution center 10 and substation 20 each has a portion of a QKD system 50 (hardware). The portion of the QKD system at the distribution center 10 will be called Alice or $QKD_A$ ("50A") and the portion of the QKD system at the substation 20 will be called Bob or $QKD_B$ ("50B"). An off the shelf QKD system may be used. For example, a Qubitekk Industrial Control Systems (ICS) commercial QKD system may be used. The QKD system 50 generates and shares the random keys (quantum keys). For example, the QKD system 50 implements an entanglement-based protocol.

The specific protocol for generating the quantum key 700 may be QKD system based. For example, BB84 is the most well-known QKD protocol.

Figure 7:
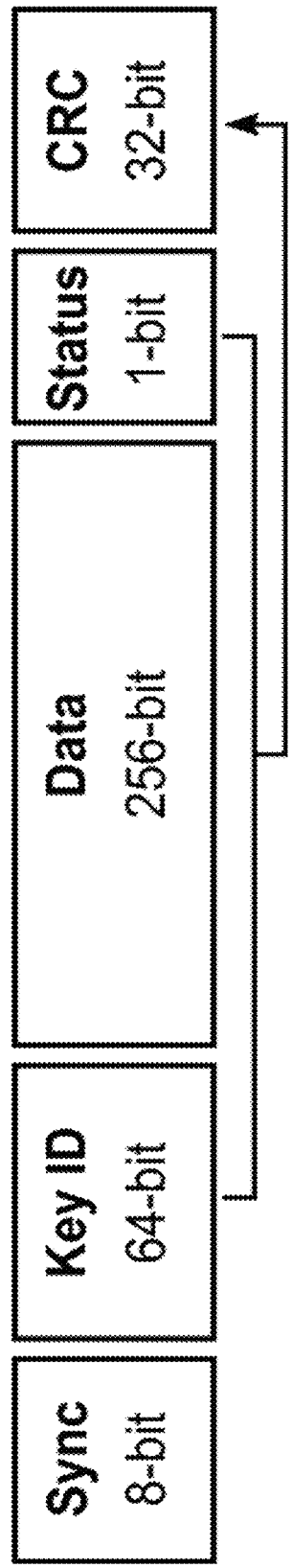
FIG. 7 illustrates an example of a quantum key storage format in accordance with aspects of the disclosure.

The QKD system 50 may generate a quantum key 700 having a specific format. The format of the quantum key 700 may be specific to the QKD system used. For example, FIG. 7 illustrates an example storage format of a quantum key 700 generated by Qubitekk ICS. In this example storage format, the quantum key format has five portions: synchronization (Sync) 800, a key ID 805, data 810, status 815 and Cycle redundancy check (CRC) 820. The sync 800 is used to determine a start of a frame. The key ID 805 is a unique identifier of the key provided by the QKD system 50. The data 810 is the string of the secret key (Key data). The data 810 is used for authentication as described herein. The key status 815 indicates the status of the key such as usable (or not). The CRC 820 includes a redundancy which is created from the key ID, the key data, and the key status. Each portion may have a specific length. For example, the sync 800 may be 8-bit. The key ID 805 may have 64-bit.

The key data 810 may be 256-bit.

The keys status 815 may be a single bit. The CRC 820 may be 32-bit.

The number of bits and portions may be different depending on the QKD system 50.

The distribution center 10 has a supervisory control and data acquisition (SCADA) controller 1 ("SCADA") (which is an example of an intelligence agent or a machine or a first device or an interface agent). An "agent" used herein may be any node on a network with a processor. Depending on the size of the utility system and number of components in the system, there may be multiple agents at either the distribution center 10 or the substation 20. The An intelligence agent used herein may be a subset of agents which determines a control feature based on information from one or more agents. The SCADA 1 may be directly connected to Alice 50A such as via a serial connection. The serial connection may be a USB connection. However, the connection is not limited to a USB connection. In an aspect of the disclosure, the SCADA 1 may be responsible for communicating all packets from the distribution center 10 to the substation 20 (such as via a switch 15). These message(s) for the packet(s) may be generated by itself or relayed from other devices within the distribution center 10.

The substation 20 has an interface agent 55. An interface agent used herein means any agent which communications with an external node on the network such as a node of another substation 20 or a distribution center or vice versa. The interface agent 55 may be directly connected to Bob 50B such as via a serial connection. The serial connection may be a USB connection. However, the connection is not limited to a USB connection. In an aspect of the disclosure, the interface agent 55 may be responsible for receiving all packets from the distribution center 10. The interface agent 55 may also be responsible for transmitting packet(s) containing message(s) from the Administration Device 60 to the distribution center 10 (such as via the switch 15).

The SCADA 1 may communicate with other devices within the distribution center 10 via an open-source communications protocol. Alternatively, as shown in FIG. 1, the SCADA 1 may communicate with other devices within the distribution center 10 via a proprietary communications protocol. An example of a proprietary communications protocol is Modbus and DNP3. The distribution center 10 may have a switch 15. The switch may be a programmable network routing device. In some aspects, the switch may be a software defined network (SDN) switch. The SDN switch may be an Ethernet switch capable of enabling and disabling ports and redirecting network traffic on command. The switch may comprise a plurality of ports. The ports may enable bi-directional communication. The communications within the distribution center 10 may be via a private network.

Similarly, the interface agent 55 may communicate with other devices within the substation 20 via an open-source communications protocol. Alternatively, as shown in FIG. 1, the interface agent 55 may communicate with other devices within the substation 20 via a proprietary communications protocol via a switch 15. The switch 15 may be the same type in both the substation 20 and the distribution center 10. The communications within the substation 20 may also be via a private network.

The distribution center 10 may also have a statistics server 100. The statistics server 100 may comprise a processor, a memory, a display and a user interface and a communications interface. In some aspects, the communications interface may be an Ethernet interface. As shown in FIG. 1, the statistics server 100 may be connected to the switch 15 (a port thereof). The statistics server 100 may receive information from the SCADA 1 and/or the interface agent 55 related to key management. This information may include the number of available quantum keys, number of used quantum keys, number of added quantum keys since a prior report. This information may also include number of quantum keys that are not an appropriate length. Additionally, the information received from the SCADA 1 and/or the interface agent 55 may include information related to the quantum random numbers such as number of available specific length strings generated from the quantum random numbers (also referred to later as the initialization vector or nonce), number of used specific length strings generated from the quantum random numbers and number of added specific length strings generated from the quantum random numbers since the prior report.

In an aspect of the disclosure, the statistics server 100 may also receive information from the recipient of the messages (such as SCADA 1 and/or the interface agent 55) including information regarding the verification. This information may include a number of successful verifications and a number of unsuccessful verifications.

In some aspects of the disclosure, the information may be periodically received. The period may be on the order of second or minutes. The information may be pushed to the statistics server 100 by the SCADA 1 and/or interface agent 55 or pulled by the statistics server 100 from the SCADA 1 and/or interface agent 55.

In other aspects, instead of being in the distribution center 10, the statistics server 100 may be located within the substation 20. For example, the statistics servers 100 may be incorporated into an administration device 60.

In other aspects of the disclosure, multiple statistics servers 100 may be used, one in the distribution center 10 and the other in the substation 20.

In some aspects of the disclosure, when the statistics server 100 is co-located with the distribution center 10, the information from the interface agent 55 may be sent using the key data 810 of a quantum key 700 for authentication and the information may be the message in the payload of a transmitted packet. In this aspect, the information may be relayed via the SCADA 1. The vice versa may happen where the statistics server 100 is co-located with the substation 20.

In some aspects, this information may be broadcast by either the SCADA 1 or the interface agent 55 (or any agent which is sending or receiving messages for authentication).

The substation 20 may also have an administration device 60. The administration device 60 may be for administrative tasks, including control and data monitoring. The administration device 60 may also comprise a processor, a memory, a display and a user interface and a communications interface. In some aspects, the communications interface may be an Ethernet interface. As shown in FIG. 1, the administration device 60 may be connected to the switch 15 (a port thereof).

The administration device 60 may receive measurement information (sensor information) and control information from the SCADA 1 (such as the current set points). The administration device 60 may transmit control instruction based on the received measurement information and current control information to the SCADA 1.

In an aspect of the disclosure, when a proprietary communications protocol is used, both the substation 20 and the distribution center 10 will have a network encryption card. An example of the network encryption NE card is a firewall and encryption device (FED). The NE or FED may be a separate device connected at the edge of the private network and the public network. The SCADA 1 may be connected the NE card via a communications interface. Similarly, the interface agent 55 may be connected to the NE card via a communications interface. In an aspect of the disclosure, the NE card may also have a processor.

Figure 2:
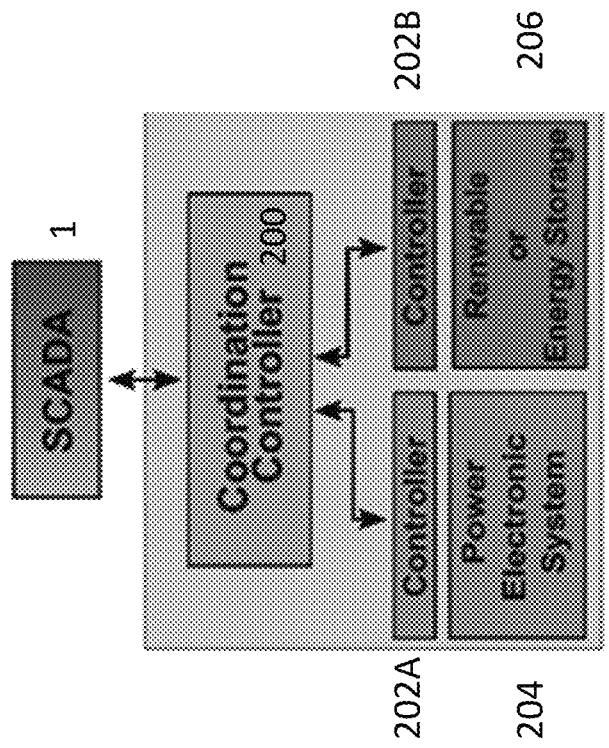
FIG. 2 illustrates a block diagram of an example of a distribution center.

FIG. 2 illustrates a block diagram of generalized architecture of a distribution center 10. Distributed energy resources (DER) may be formed from an integration of a power electronic controller (PEC) (which is also an example of an agent) and an energy resource. For example, in FIG. 2, a controller 202A and a power electric system 204 may be a DER, similar controller 202B and renewable or energy storage 206 may be a DER.

A DER may have one or more interfaces or generically "a coordination controller" 200. An integration layer such as the coordination controller 200 couples the systems, e.g., power electric system 204, renewable or energy storage 206. The coordination controller 200 can be placed directly within the hardware system and provides an opportunity to automatically enable the QKD system 50 to be applied to many different PEC-type resources. For example, in an aspect of the disclosure, a connection between the storage (memory) may be established. This connection may be a time multiplexed connection. The quantum keys 700 may be received from storage and pushed to a PEC. This connection and pulling may be repeated for each PEC. This may be done if a PEC is the transmission source or the interface agent 55.

Figure 3:
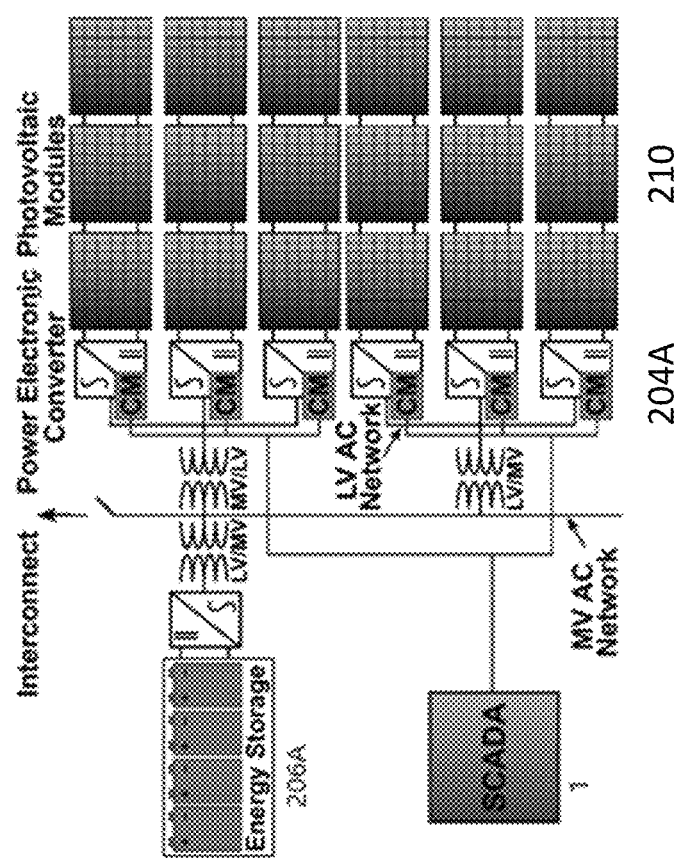
FIG. 3 illustrates an example of a photovoltaic distribution center with a voltage collector system and communications network.

The coordination controller 200 is configured as a means for integrating many types of PECs and resources. The coordination controller 200 also acts as a communication translator for communicating to utility system(s). The communication module transmits/receives information from/to the various controllers to/from the SCADA 1. For example, for a photovoltaic plant, the controllers 202 may be a photovoltaic controller and a power electronic converter controller. FIG. 3 illustrates an example of a photovoltaic plant (an example of a distribution center 10). The plant comprises a plurality of photovoltaic modules 210. These photovoltaic modules 210 generate electricity. The generated electricity is converted for storage by power electronic converter 204A. The conversion is controlled by a controller in coordination with the SCADA 1. Within the photovoltaic modules 210 and the power electronic converter 204A there may be sensors such as voltage, current and/or temperature sensors. The information from sensors may be transmitted directly from the sensors or indirectly from the sensors via the controllers 200 to the SCADA 1. As shown in FIG. 3, each power electronic converters 204A has its own communications module (CM). The controllers use the CM to communicate with the SCADA 1. The plant also includes one or more transformers. The transformers as shown are MV/LV or LV/MV. The low voltage (LV) is represented typically at 3-phase 480V. This is transformed to a medium voltage (MV) or distribution voltage often at 13.8 kV or 34.5 kV. The MV is collected. The MV is transformed back to a LV for storage in the energy storage 206A. Although not shown, there may also be temperature, current and voltage sensors in the energy storage 206A and a communications module to communicate with the SCADA 1.

While FIG. 1 illustrates the SCADA 1 connected with Alice 50A and communicating with the substation 20 (via the switch 15), any device within the distribution center 10 may be instead connected with Alice 50A as an interface agent and communicate with the substation 20 instead of via the SCADA 1.

In an aspect of the disclosure, each of Alice 50A and Bob 50B further comprise a quantum random number generator (QRNG). In other aspects, the QRNG may be separate from the QKD system 50. The QRNG may also be an off the shelf device. In an aspect of the disclosure, each QRNG may output a plurality of strings of random numbers. The respective strings of random numbers may be respectively made available to the SCADA 1 (or other local intelligence agent within the distribution center 10) and the interface agent 55 at the substation 20. Each string may be converted into a smaller string for further processing.

Figure 5A:
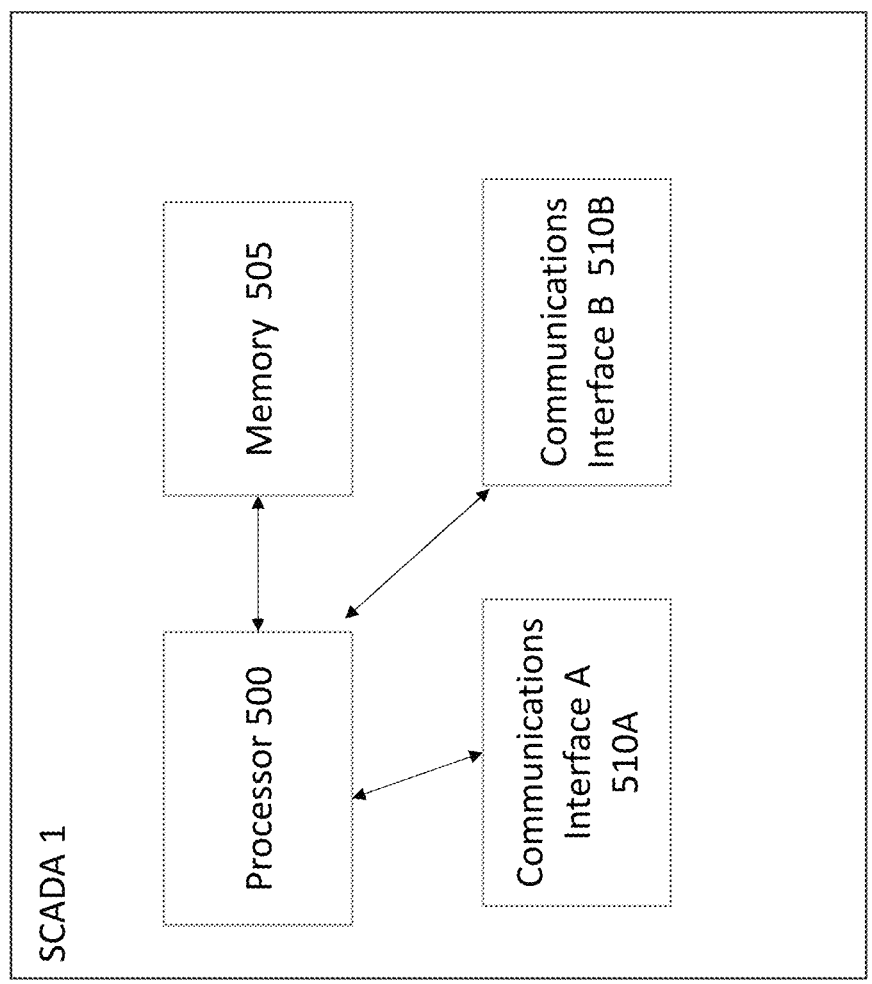

FIG. 5A illustrates a block diagram of the SCADA 1 in accordance with aspects of the disclosure. The SCADA 1 has a processor 500. The processor 500 may be a CPU. In other aspects, the processor 500 may be a microcontroller or microprocessor or any other processing hardware such as a field programmable gate array (FPGA). The processor 500 may be configured to execute one or more programs stored in a memory (such as memory 505) to execute the functionality described herein.

The memory 505 may be configured to store a plurality of quantum keys 700 receives from Alice 50A and the quantum random numbers receives from the QRNG.

The SCADA 1 may also comprise a plurality of communications interfaces such as communications interface A 510A and communications interface B 510B. The communications interface 510A may be a serial interface such as a USB interface to receive the plurality of quantum keys 700 from Alice 50A. In response to the receipt of each quantum key 700, the processor 500 may check key data 810 of the quantum key 700 for the appropriate length to avoid runtime errors caused by inadequate quantum key length. For example, for the format described above, the key data 810 may be 256-bit. Therefore, the processor 500 may confirm that the key data 810 is 256-bit. If the key data 810 of the quantum key 700 is not the appropriate length, the processor 500 may ignore the quantum key 700 and not store the key data 810 in memory 505. In other aspects, if the processor 500 determines that the key data 810 of the quantum key 700 is not the appropriate length, the processor 500 may store the quantum key 700 separately with a flag not to use. In some aspects, the processor 500 may keep a counter of the number of quantum keys received that do not have the appropriate length. This may be an indicator of some noise or interference within the quantum channel 3. In some aspects, when the number of quantum keys that do not have the key data 810 with the appropriate length exceeds a threshold, an investigation may be triggered. In other aspects of the disclosure, depending on the QKD system, the QKD system may emit a key generation failure error if the quantum error rate exceeds a threshold. For example, the QKD system may output only a single key bit of 0.

When the processor 500 confirms that the quantum key 700 has key data 810 with the appropriate length, the quantum key 700 is stored in memory 505 and a record for the quantum key 700 may be created. In some aspects, only the key data may be stored 810 and deemed the quantum key for used. The record may include a specified number assigned to the quantum key. This specified number may be different from the key ID 805 in the quantum key which is assigned by the QKD system 500. The specified number may be a next number from a consecutive arbitrary number list. In some aspects of the disclosure, quantum keys 700 (key data 810) having a specified ODD number may be used by the distribution center 10 to transmit a packet to the substation 20 and a specified EVEN number may be used by the substation 20 to transmit a packet to the distribution center 10 (or vice versa). In other aspects, a different division of the specified numbers may be used such as the first X specified numbers may be used by the distribution center 10 for transmission and the next Y specified numbers may be used by the substation 20 for transmission and so on. The record may also have a Boolean status flag indicating that the key data 810 of quantum key 700 has not been used for transmission (authentication of the message). This Boolean status flag is updated when the quantum key 700 is selected and used. Using the key data 810 and using the quantum key 700 is interchangeably referenced herein. The Boolean status flag is different from the key status 815 in the quantum key format provided by the QKD system.

The SCADA 1 may also receive the quantum random number from the QRNG via the communications interface 510A. In response to receipt of the quantum random number the processor 500 may convert the string of numbers into a preset length and store the preset length of numbers. For example, the preset length may be a specific length associated with a specific authentication algorithm such as 128-bit. In an aspect of the disclosure, Alice 50A may have a different QRNG than Bob 50B and the quantum random numbers received may be different. The SCADA 1 and the interface agent 55 individually manages the local quantum random numbers and conversions since the random numbers and the specific length conversion do not need to be identified between the nodes. The specific length conversion produces an initialization vector (IV) or nonce which may be used in the process to generate a message authentication code as will be described later. Each IV may be assigned a unique identifiers "j" where "j" is an arbitrary number for each IV. In other aspects, the SCADA 1 may store the quantum random numbers received from the QRNG and subsequently when a packet needs to be transmitted, the SCADA 1 may produce the IV from a selected quantum random number selected from a plurality of stored quantum random numbers.

The communications interface B 510B may be a local area network (LAN) interface such as an Ethernet port. In some aspects of the disclosure, when a proprietary communications protocol is used, the communications interface B 510B may be connected to the NE card.

The interface agent 55 at the substation 20 may have the same components such as a processor 500, memory 505, communications interfaces A and B 510A, 510B. The interface agent 55 is connected to Bob 50B via the communications interface A 510A and may receive the plurality of quantum keys 700 from Bob 50B (shared by the QKD system). Initially, the memory 505 in both the interface agent 55 and SCADA 1 may have the same records which indicates that the quantum keys 700 are not used. Similarly, when a proprietary communications protocol is used, the communications interface B 510B in the interface agent 55 may be connected to the NE card. Additionally, when a proprietary communications protocol is used, the interface agent 55 and SCADA 1 may not be connected to the QKD system 50, rather the NE card may be connected instead.

FIG. 8 illustrates an example of a plurality of quantum keys 700 received from the QKD system 500, which is subsequently stored in memory 505. One of the quantum keys 700 is annotated showing the five portions described above for the example format.

In accordance with aspects of the disclosure, the key data 810 of the quantum keys 700 and the initialization vectors are used to authenticate payloads transmitted in packets between remote devices/systems such as the distribution center 10 and the substation 20. For example, a key data 810 of the quantum key 700 and initialization vector may be used to generate a code for authentication of a payload e.g., a message authentication code (MAC).

The MAC may be generated using an information-theoretic method. For example, the MAC may be generated using a Galois/Counter mode (GCM). GCM is a parallelizable symmetric-key cryptographic protocol based on the Carter-Wegman authentication scheme. Advantageous, the message itself does not need to be encrypted. The GCM outputs a Galois message authentication code (GMAC) for authentication (without encryption).

The GMAC may be based on three inputs: (1) the message(s) to be authenticated, (2) an initialization vector (IV), also referred to as a nonce, and (3) the quantum key 700. In an aspect of the disclosure, same quantum key 700 may be reused, however, it must be reused with a different IV (preset length of numbers generated from the quantum random number). Similarly, the same IV may be used with a different quantum key 700.

However, the MAC may be generated using other hash functions or means such as Poly1305.

The MAC may be generated for each outgoing message (or a group of messages if collectively sent). In an aspect of the disclosure, the message(s) to be sent may include a timestamp. The timestamp may be used by the recipient to verify whether there was a delay in the reception of the payload or replay-attacks. The message(s) may also include the key ID of the quantum key used to generate the MAC (selected quantum key).

In some aspects of the disclosure, a messaging protocol such as Message Queuing Telemetry Transport (MQTT) may also be used for the transmission of the packet. In this aspect of the disclosure, the message may also include a topic. However, MQTT is not required for the authentication and the topic may be omitted from the message.

FIG. 6 illustrates an example of a method for creating the payload for transmission in accordance with aspects of the disclosure. The example is shown for an open-source communications protocol. The figure shows pseudocode for the functions. In an aspect of the disclosure, the processor 500

(at either the SCADA 1 or the interface agent 55) which is the transmitting device may execute. While FIG. 6 shows pseudocode and the processor 500 may be a CPU executing computer-readable instructions, the functions may also be executed by hardware pre-configured such as an application-specific integrated circuit (ASIC) or FPGA. The method illustrated is also for the MQTT protocol which has a topic t which is a part of every packet in the MQTT protocol. When a different protocol is used, topic t may be omitted.

The Input is a message and the topic. The message and topic may be dependent on the transmitting node (transmitter). For example, when the SCADA 1 is the transmitter, the topic may be Measurement and the message may be measurement information. Additionally, the topic may be Control and the message may be current control information determined from the measurement information (previous measurement information or current measurement information). An example of the control information may be a set point such as a voltage or current. The measurement information may be a temperature measurement, a current measurement, or a voltage measurement. The temperature measurement may be a temperature of the transformer(s), power electronics, cooling systems, etc. The Control may also include "state" information, such as the state of actuators or pumps, physical switches, etc., such as OFF/ON, OPEN/CLOSED.

When the SCADA 1 is the transmitter, the message may be originated by the SCADA 1 such as current set points (calculated based on the previous or current measurement information) or originated by other devices within the distribution center 10 such as the measurement information (such as from the local controllers 202A, 202B) or smart sensors.

When the interface agent 55 is the transmitter, the message may be originally from the administration device 60 and relayed via the interface agent 55. The message may be control information including set points and the topic may be Control.

For the following description, the processor 500 in the transmitting device, will be simply referred to as the processor 500.

To start, the processor 500 receives or generates the message. The message is assigned as m. Depending on the content of the message, the processor 500 assigns the topic t, such as Measurement or Control. The processor 500 retrieves an available quantum key 700 from memory 505 (key data 810 thereof). In an aspect of the disclosure, the processor 500 may select the next available quantum key 700 from memory 505 by number order as such the specified number "n". In other aspects, the processor 500 may select any random quantum key 700 which is available. The n may be transmitted to indicate to the receiver which quantum key 700 was used, e.g., without disclosing any information about the key data 810 itself. For example, the specified number assigned to the quantum key may be $k_1, \ldots, k_n$ where n is a unique number.

In an aspect of the disclosure, n is part of the overall message to be authenticated. The processor 500 may obtain the current time for a timestamp to be included in the total message. The timestamp may be obtained via an internal clock or any other method. The timestamp is assigned as ts. The total message $tm_i$ where i is the number of the message and its related topic to be authenticated becomes:

$$tm_i = m_i + t_i + n + ts \quad (1)$$

After the total message is defined, the processor 500 retrieves an available initialization vector (nonce) from the memory 505. In an aspect of the disclosure, the processor 500 may select the next available initialization vector from memory by number order. Initialization vectors may be assigned a serial number. In some aspects, the serial number may be set arbitrarily $iv_1, \ldots, iv_j$ where j is an arbitrary serial number for each iv. In other aspects, the processor 500 may select any random IV which is available. Once $k_n$ and $iv_j$ are retrieved for use, they are immediately flagged as used.

In an aspect of the disclosure, the unique combination of quantum key 700 and initialization vector may be recorded such that the same combination may not be reused if the individual quantum key or initialization vector is allowed to be separately reused.

The processor 500 then generates the message authentication code for each $tm_i$. In some aspects, the MQTT built-in publish( ) callback function may be used to create the specific message authentication code from the sender $mac_S$ for each $tm_i$ being published using the GMAC encryption $GMAC_E$ algorithm such that:

$$mac_S = GMAC_E(tm_i, k_n, iv_j) \quad (2)$$

where the total message $tm_i$, secret key $k_n$, and initialization vector $iv_j$ are inputs to the GMAC algorithm, and $mac_S$ is a 16-byte string uniquely associated with the inputs.

The processor 500 then generates the payload p 900 for transmission. The payload p 900 of each message being published becomes:

$$p = tm_i + iv_j + mac_S \quad (3)$$

To verify the authenticity of the $tm_i$, the sender needs to share the $mac_S$ and the initialization vector $iv_j$ with the recipient while keeping the secret key $k_n$ secret.

In an aspect of the disclosure, delimiting characters may be an added component of the total message tm when constructing the payload, e.g., using dashes, $m_i$-$t_i$-n-ts-$iv_j$-$mac_S$, for convenient payload coding and decoding.

In an aspect of the disclosure, when the proprietary communications protocol is used, the generation of the packet for external transmission may be executed by the NE card 415 (FED). In this aspect of the disclosure, the SCADA 1 or another agent may transmit the message to the NE card 415. The NE card 415 may also be connected to the QKD system 1 and the QRNG. Since the message is in a proprietary protocol, the message may not be able to be altered. Thus, the total message may be just the original message. Therefore, the NE card 415 may generate the MAC from the original message, an initialization vector generated from the quantum random number received from the QRNG and the quantum key received from the QKD system 1. In an aspect of the disclosure, the NE card 415 may receive both the quantum random number from the QRNG and the quantum key 700 in an on-demand basis (without a need for selection from pre-stored quantum keys and quantum random numbers). In this aspect, the QKD system 50 would share the quantum key with the NE cards 415 at both the sender and the recipient at the same time. Also since there is only one quantum key, there may not be a need to transmit the key number in the packet. The packet may be produced by the NE card 415 using the generated MAC, the initialization vector, and the original message. In some aspects, a timestamp may also be used. The packet may also comprise the topic.

In an aspect of the disclosure, the NE card may also have a proprietary protocol or an open-source protocol. If an open-source protocol is used in the NE card 415, the NE card 415 may also store a plurality of quantum keys and quantum random numbers as described above for selection.

Figure 9:
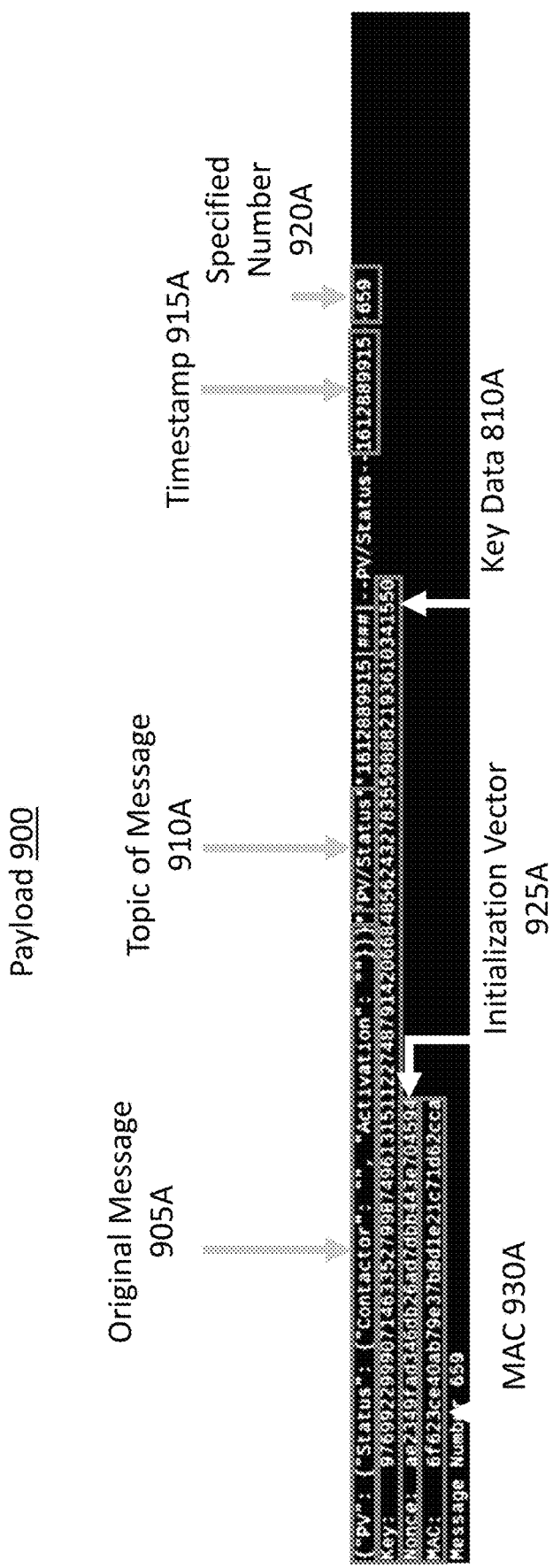
FIG. 9 illustrates an example of a payload in accordance with the method illustrated in FIG. 6 with annotations.

FIG. 9 illustrates an example of the payload 900 in accordance with aspects of the disclosure when an open-source communications protocol is used. An example of the original message 905A is a status update of a contactor. The topic of the message 910A is PV/Status. The timestamp 915A is 1612889915. The unique serial number 920A of the quantum key is 659. The quantum key data 810A is shown in the second line. The initialization vector 925A (or nonce) is shown in the third line. The calculated MAC 930A is shown in the fourth line after the initialization vector. In this example, a message number is also included for tracking purposes. In other aspects, the payload 900 may also not contain information on different lines and the depiction of the different lines of information is shown for example only.

Figure 10:
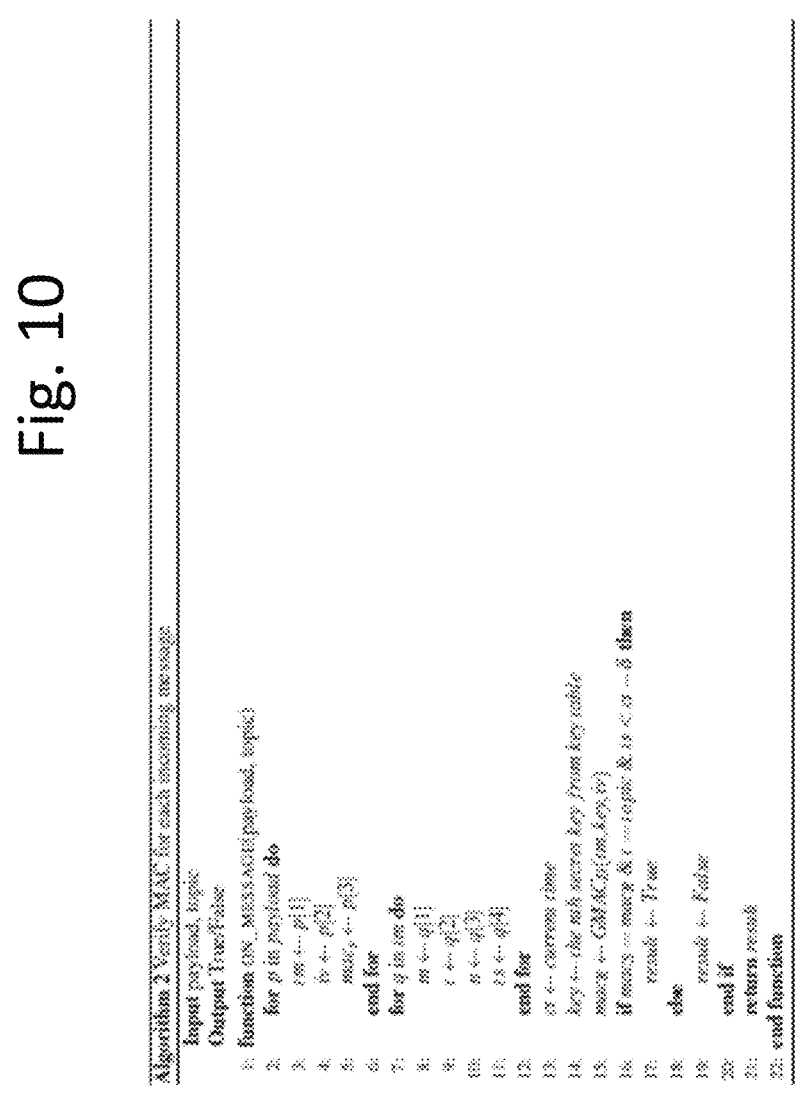

FIG. 10 illustrates an example of a method for authenticating the payload in accordance with aspects of the disclosure when an open-source communication protocol is used. The figure shows pseudocode for the functions. In an aspect of the disclosure, the processor 500 (at either the SCADA 1 or the interface agent 55) which is the receiving device may execute. While FIG. 10 shows pseudocode and the processor 500 may be a CPU executing computer-readable instructions, the functions may also be executed by hardware pre-configured such as an ASIC or FPGA. The method illustrates is also for the MQTT protocol where MQTT on_message( ) callback function may be used to verify every received message.

For the following description, the processor 500 in the receiving device, will be simply referred to as the processor 500. In the MQTT protocol, the received packet may contain various elements such as the QoS, flags, the topic t, and the payload p. The topic t is used to facilitate the transmission of the correct packet to the intended recipient such as the subscriber. However, in accordance with aspects of the disclosure, the topic t is also included in the payload p as described above. The inclusion may also be used in the verification to ensure the topic t outside the payload p matches the topic t within the payload p, e.g., makes sure the topic and payload are related.

In response to a receipt of a packet, the processor 500 begins to divide the payload into components. For each received payload 900, the processor 500 uses the delimiting character(s) to first identify the three main portions of the payload 900: p[1] the total message $tm_i$, p[2] the initialization vector $iv_j$ and p[3] the $mac_S$.

The processor 500 then uses the delimiting characters to separate the total message $tm_i$ into its components. For example, the processor may divide $tm_i$ into: q[1] which may be the message(s) themselves, q[2], which is the topic, q[3], which is the specified number and if included, q[4], the timestamp ts.

The processor 500 may determine the current time if a timestamp is included in the total message. For example, the current time may be determined from an internal clock.

The processor 500 initially may verify whether the quantum key 700 received is usable, e.g., whether it has been used before and is appropriate for use in the transmission. In an aspect of the disclosure, the processor 500, using the specified number, may retrieve the record, stored in memory 505 associated with the key data 810 of the quantum key that is received. The record includes a flag or identifier indicative of whether the quantum key 700 had been previously used. In other aspects, the processor 500 may also determine whether the combination of the quantum key 700 and the initialization vector has been used (if key reuse or initialization vector reuse is available). If the processor 500 determines that the quantum key received is not available, e.g., already used or should only be used for transmission by the receiving device, or used in combination with the same initialization vector, the processor 500 determines that the payload is not authenticated, e.g., false.

Otherwise, the processor 500 continues with the authentication. The processor 500 may compare the timestamp ts included in the received packet with the current time to determine if there was a delay. In some aspects, the processor 500 may consider a typical or expected delay in the network. An expected delay may be defined as $\delta$. For example, the processor 500 may determine whether ct, which is the current time, is less than ts−$\delta$. If there was a delay, in some aspects, an investigation may be initiated to determine the root cause. For example, the delay may depend on classical network synchronization, e.g., Precision Time Protocol and Network Time Protocol, any anomalies detected in timing may trigger further investigation. However, the packet may be further processed for verification. In other aspects, the processor 500 may deem the packet not authenticated, e.g., false.

The processor 500 may also retrieve the last used quantum key (key data thereof) to determine if the packet is replayed. The last used quantum key may be determined based on the specified number). If the specified number is the same, the processor 400 may deem the packet not authenticated, e.g., false. In some aspects, the processor 500 may trigger an investigation.

The processor 500 may then determine a receiver message authentication code. For example, the processor 500 may use the received $tm_i$, $iv_j$, $mac_S$, and the corresponding $k_n$, to perform the verification GMAC decryption $GMAC_D$ as follows:

$$mac_R = GMAC_D(tm_i, k_n, iv_j) \quad (4)$$

The processor 500 compares the received $mac_S$ and the calculated $mac_R$. If both matches, then $tm_i$ (including the original messages) $m_i$ are authentic, and authenticated; otherwise the authenticity cannot be established for the payload. In some aspects, a further investigation may be triggered. For example, the processor 500 may issue an alert to another device which includes a display and/or a user interface (HMI).

If the authentication succeeds, the processor 500 causes a flag in the record associated with the received quantum key to be updated and/or the received initialization vector.

Additionally, the processor 500 may increment a counter associated with an authentication. In some aspects, the processor 500 may increment another counter associated with a received packet. In other aspects, the processor may increasement another counter associated with the received topic.

If the authentication fails, the processor 500 may update the record associated with the received quantum key and/or initialization vector to indicate that the authentication process fails with the quantum key and/or initialization vector. The processor 500 may also increment a counter associated with an unsuccessful authentication.

When the proprietary communications protocol is used, and the NE card 415 receives the packet, a similar authentication process may be executed. However, as described above, there may only be one quantum key and one quantum random number (initialization vector) and no selection. In this case, the division of the "total message" may not be needed since the total message may be the message. Additionally, the specified number may also not be included in the packet. The NE card may generate the receiver MAC using the message, the key data 810 for the one quantum key and the initialization vector. The comparison may be the same as described above. Similarly, if a timestamp is included, the NE card 415 may the timestamp is included in the received packet with the current time to determine if there was a delay.

Figure 11:
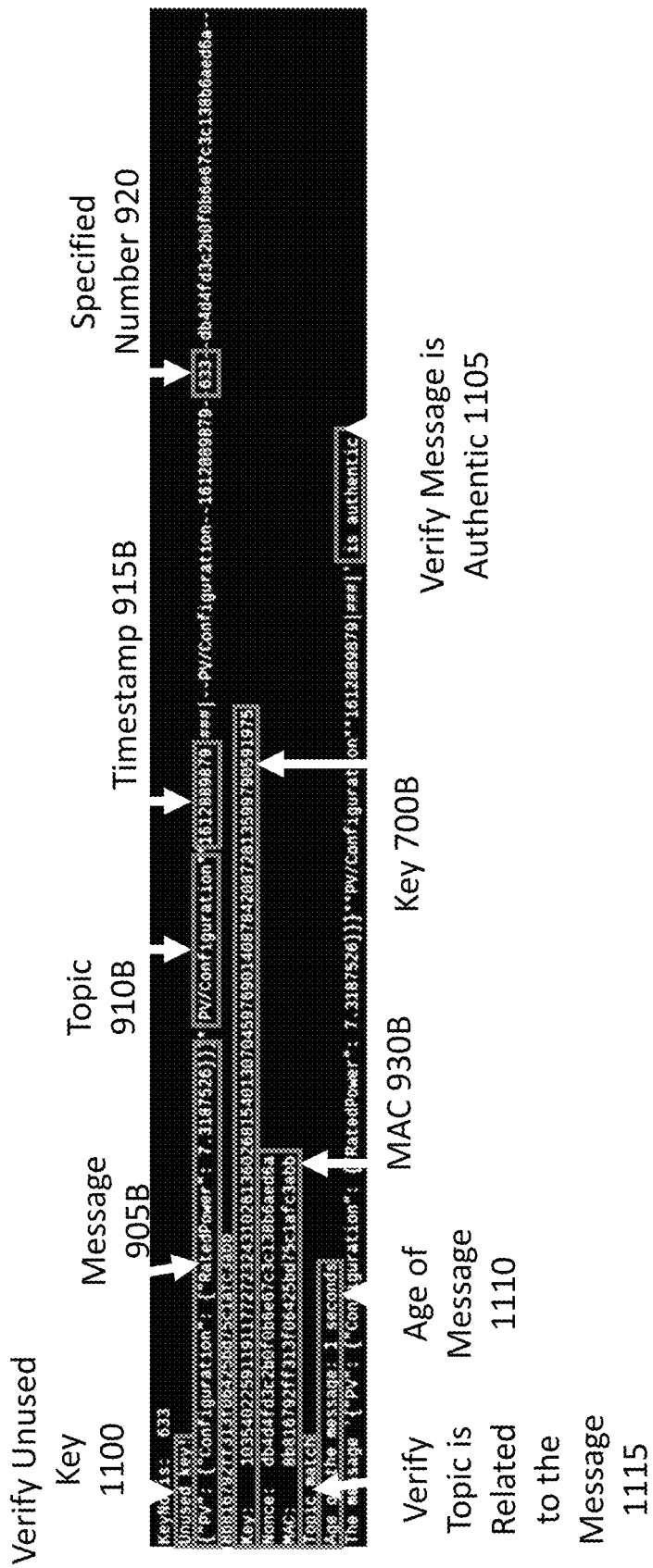
FIG. 11 illustrates an example of a verified incoming payload which is verified in accordance with the method illustrated in FIG. 10.

FIG. 11 illustrates an example of the authentication when an open-source communications protocol is used. The specified number 920 is shown as "633", the key is verified as unused 1100. The verified delay, e.g., the time difference is noted as the age of the message 1110. In the example shown, the age is 1 second. The timestamp 915B is the received timestamp. In an aspect of the disclosure, the topic may also be verified as a match 1115 (as related to the message). The topic is identified as topic 910B. As noted above, the topic t may be included outside the payload. The topic in the payload may be compared with the topic outside the payload to determine if they match. When they do not match, the payload/message may be flagged. In some aspects, when they do not match, the authentication process may fail. The message 905B is shown and it is verified as authentic 1105 using the received MAC 930B (based on the retrieved key 700B).

In an aspect of the disclosure, the sender and recipient may be time synchronized. In some aspects, the time may be synchronized by global positioning system (GPS), precision time protocol (PTP) or network time protocol (NTP) or other method to calculate the age of the message, e.g., time difference.

In other aspects of the disclosure, the message itself may be checked to determine if it makes sense for the topic. There may be a range of valid messages associated with the topic. If the message is not when the valid message range, e.g., not related to the topic, the payload may be flagged but the verification process may be deemed successful. While the verification may be deemed successful, an investigation may be triggered. In some aspects, the authentication process may be deemed to be a failure.

Figure 4A:
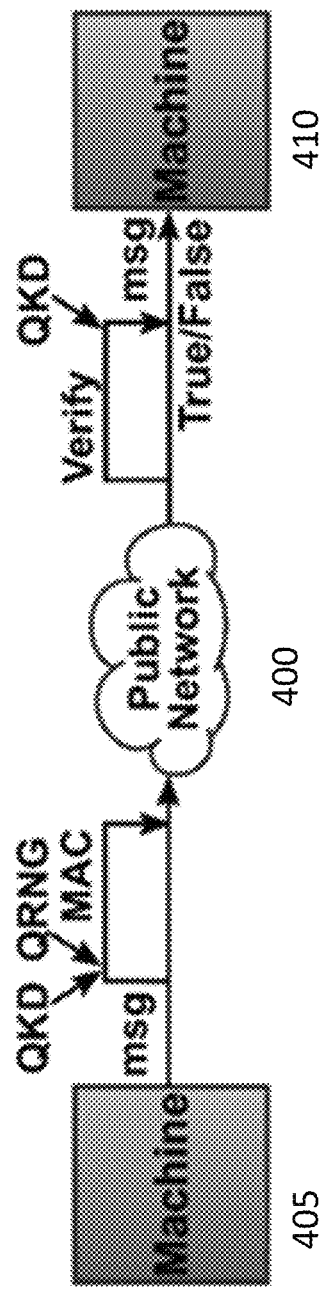
FIG. 4A illustrates an example of a payload transmission from one machine to another via a public network which is implemented in an open-source communication protocol environment and FIG. 4B illustrates an example of a payload transmission from one machine to another via a public network which is implemented in proprietary communication protocol environment between a machine of a private network and the edge of the private network.
Figure 4B:
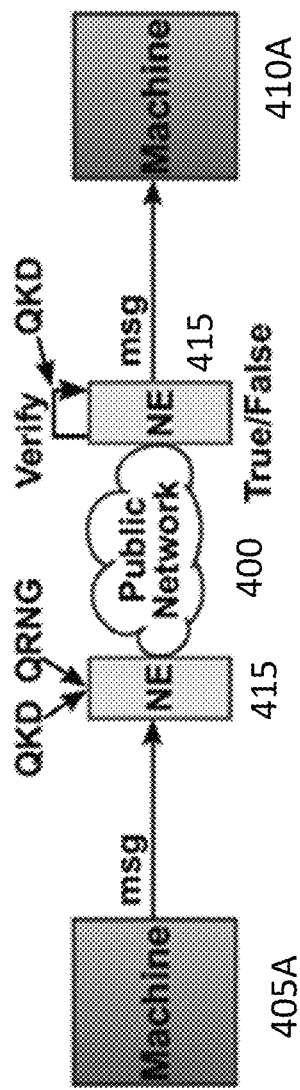

The authentication process may be executed in an open-source communications protocol such as shown in FIG. 4A between machine 405 and machine 410. The machine 405 may generate the message or receive a message generated by another agent within a private network. The MAC may be generated using key data 810 of the quantum key 700 and the initialization vector (represented in FIG. 4A as being acquired from a QKD and QRNG) and total message as described above which in turn generates the payload for the packet. This packet may be transferred via the public network 400. Upon receipt, this packet may be verified by a machine 410 using the same quantum key (and initialization vector), e.g., true/false. The message (msg) may be received by the other machine 410. As described above, the machines 405, 410 may be an intelligence agent such as the SCADA 1 or an interface agent 55.

In other aspects, the authentication process may be executed in a proprietary communications protocol. The message once again may be generated by a machine 405A or received from another agent within a private network. However, since the message may not be able to be manipulated due to the proprietary communications protocols for authentication, the message is routed to a NE 415 NE 415 for transmission via a public network 400. NE card 415 as described above may generate the MAC and generate the payload for the packet. The packet may be transmitted via the public network 400. NE card 415 may receive the packet with the payload for authentication and verify the payload in the packet for the machine 410A. The NE card routes the message to the machine 410A.

Figure 12:
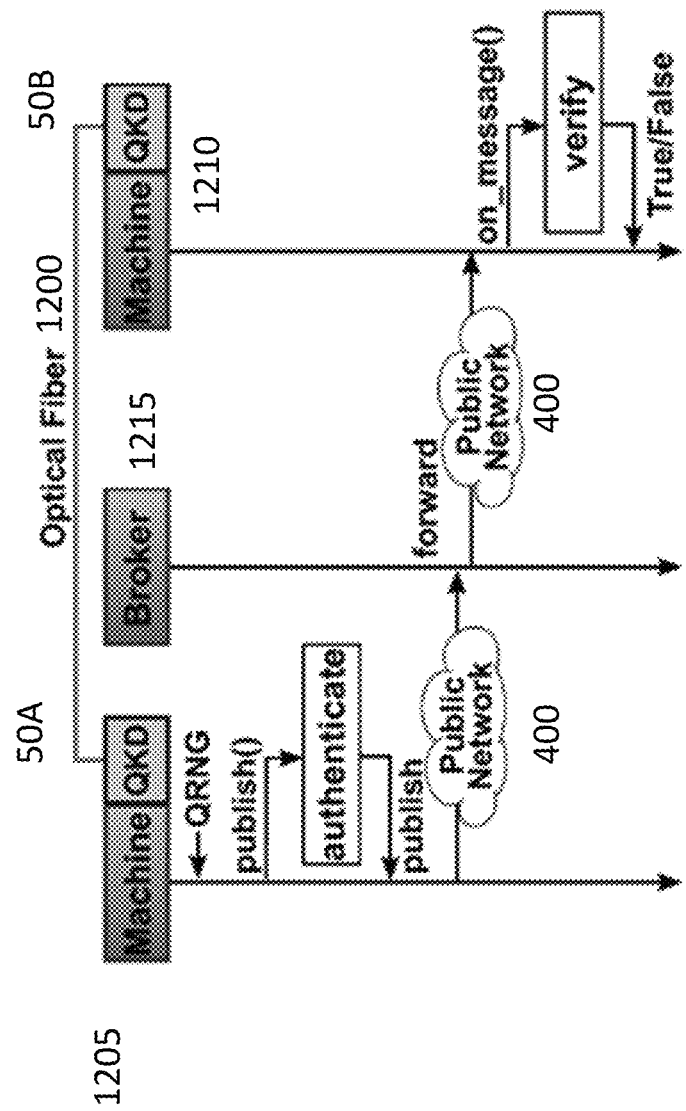
FIG. 12 illustrates a flow of transmission and verification of a message using a publisher/subscriber protocol in accordance with aspects of the disclosure.

In an aspect of the disclosure, the packets may be relayed between machines 1205, 1210 such as a SCADA 1 and interface agent 55 via a broker 1215 using the MQTT publisher/subscriber protocol such as shown in FIG. 12.

Machine 1 is co-located with a part of the QKD system 50A and machine 2 is co-located with the part of the QKD system 50B. The QKD system 50 is connected via optical fiber 1200 (cables) (quantum channel 3). It is noted that the quantum keys 700 are shared via the quantum channel 3 and classical postprocessing to generate private keys is carried out via an authenticated classical channel between QKD system 50A and 50B (not shown in FIG. 12). The QRNG is also co-located with a transmitter (machine 1205 in FIG. 12). publish( ) is an MQTT specific command used to generate the payload for the transmission packet.

Each machine 1205, 1210 requests to connect to the broker 1215. In some aspects, this request may use a TCP/IP protocol including a broker IP address and port number. In some aspects, a default port number may be used for the MQTT protocol. A successful connection request may be acknowledged with a message containing a connect flag by the broker 1215.

Individually, each machine 1205, 1210 may inform the broker 1215 about the list of topics available and each quality of service (QoS). The QoS indicates the level of reliability required based on the network and the application requirements. QoS 0 indicates a best-effort service—delivery is not guaranteed—a published packet is transmitted to a subscriber once, and no acknowledgment of delivery is required. In QoS 1, a published packet is generated to be delivered at least once. Therefore, an acknowledgment flag is required from the subscriber to confirm the delivery, or retransmission of the same packet is triggered: lost acknowledgment flags trigger retransmission of previously delivered packets. The QoS may be included in each transmitted packet.

Using a four-way handshake, QoS 2 guarantees that a packet is published and delivered to a subscriber exactly once: it ensures that no duplicate packets are sent to the same client.

In an aspect of the disclosure, when a packet/payload is authenticated, the recipient (e.g., machine 1210) subscribes to the topic contained therein. However, authentication is not required for subscription.

In an aspect of the disclosure, the published packets may be asymmetric in time. For example, machine 1205 (such as the SCADA 1) may publish packets more frequently than machine 1210 (such as the interface agent 55). For example, the SCADA 1 may publish packets containing messages with system status, measurements, and errors in a fast periodic timing. But, the interface agent 55 (example of machine 1210) may publish packets containing set points and control as a slower pace. However, the publications may still be on the order of seconds. Therefore, the number of quantum keys 700 used in the transmission may also be asymmetric.

In an aspect of the disclosure, the machines 1205, 1210 such as the SCADA 1 and the interface agent 55 may report information to the statistics server 100 periodically. In some aspects, the period may be on the order of seconds. In other aspects, the reporting may be on the order of minutes.

In an aspect of the disclosure, new quantum keys 700 may be generated when the number available quantum keys for transmission reaches a threshold. The threshold may be variable based on the frequency of transmission. In some aspects, since the frequency of transmission may be different, the threshold for different agents may be different for different transmission devices such as the SCADA 1 and the interface agent 55. Additionally, the threshold may be set based on environmental conditions such as wind or rain, synchronization delay, network conditions and reporting period or delays.

In some aspects, the threshold may be set as T=30 as the minimum number of quantum keys available. However, the threshold is not limited to this number and other numbers may be used as the threshold.

Figure 13:
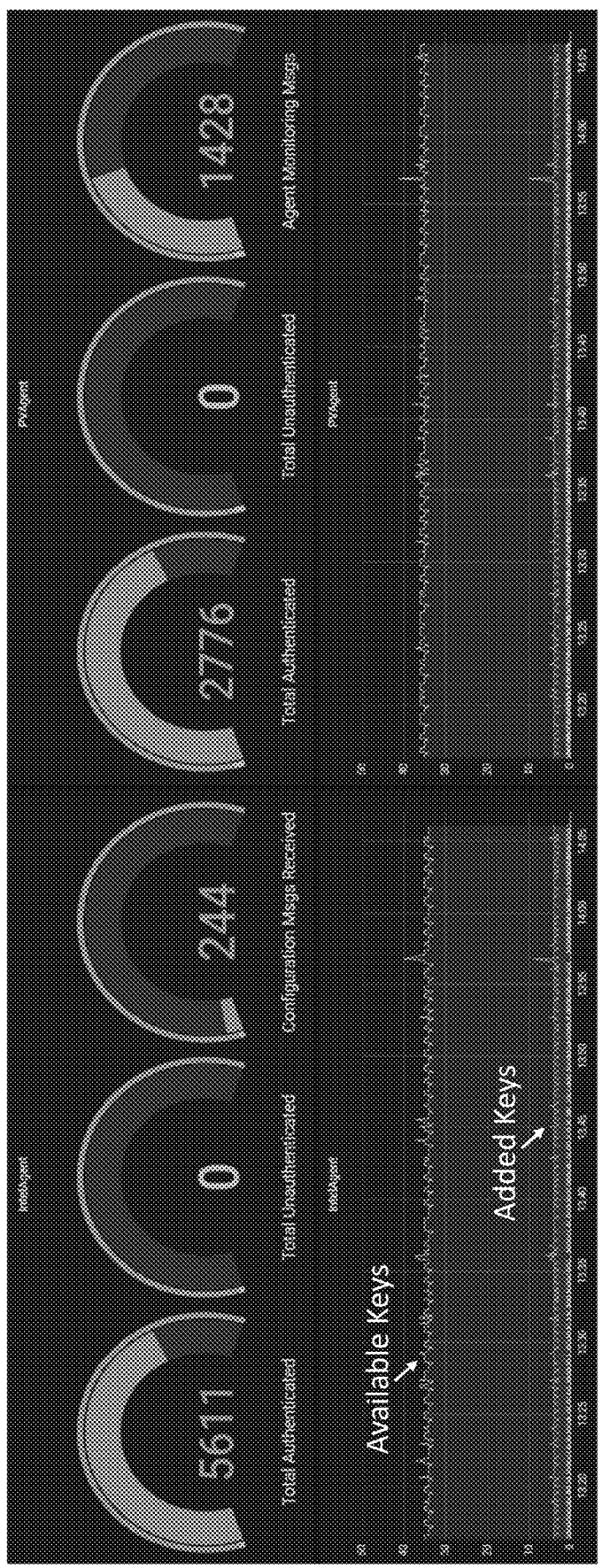
FIG. 13 illustrates an example of a dashboard on a statistics server in accordance with aspects of the disclosure.

The information received by the statistics server 100 may be displayed on a display. For example, the information may be displayed using a graphic user interface such as in the form of a dashboard 1300 an example of which is shown in FIG. 13. This dashboard 1300 may be used to visualize the available quantum keys and added quantum keys as a function of time at each machine 1205, 1210 such as the SCADA 1 (intelligence agent) and the interface agent 55. The time information may be used to trigger the generation of new quantum keys. For example, the server 100 may automatically cause the QKD system 50 to generate and share the quantum keys 700. For example, the server 100 may issue an instruction via an open-source communications protocol to the QKD system 50. In other aspects, a user may obverse a drop in the number of available quantum keys and issue an instruction via an open-source communications protocol to the QKD system to generate new keys.

In other aspects, the SCADA 1 and/or the interface agent 55 may directly issue an instruction via an open-source communications protocol to the QKD system to generate additional keys.

Similarly, a threshold may be used for the initialization vector and when the number of initialization vectors is below the threshold, new quantum random numbers may be generated.

The dashboard 1300 may also depict the total number of authenticated packets/payloads by each machine 1205, 1210 such as the SCADA 1 and the interface agent 55 and total number of unsuccessful authentications. This number may be for a preset period of time. The dashboard 1300 may separately display the information from the different machines such as the SCADA 1 and the interface agent 55. As depicted in the example in FIG. 13, the information from the SCADA 1 (intelligence agent) is on a first side of the dashboard 1300 and information from the interface agent 55 is on a second side of the dashboard 1300.

The respective NE cards 415 may also transmit information regarding the authentication to the statistics server 100. When multiple quantum keys and quantum random numbers are stored in the NE cards 415, the NE cards 415 may also transmit information regarding the quantum keys and the quantum random numbers to the statistics server as well.

In an aspect of the disclosure, the statistics server 100 may store an investigation threshold in its memory. This investigation threshold may be a number of unsuccessful authentications within the preset period of time. In other aspects, the investigation threshold may be a percentage of unsuccessful authentications within the preset period of time. When the threshold is reached, the statistics server 100 may initiate an investigation into the root cause. In other aspects, the statistics server 100 may cause a warning or a notification to be displayed on the dashboard 1300 when the threshold is reached.

In an aspect of the disclosure, the dashboard 1300 may also separately display the number of received messages. In some aspects, each topic may be separately displayed for each message type. For example, as shown in FIG. 13, the number of configuration messages is shown for the SCADA 1 (intelligence agent) and number of agent monitoring messages is displayed for the interface agent.

FIG. 13 is just an example of a dashboard 1300 and the user may customize the dashboard to include other information or other types of graphs or charts. Different colors may be used for warnings such as low quantum keys or initialization vectors or a high number of unsuccessful authentications.

As used herein terms such as "a", "an" and "the" are not intended to refer to only a singular entity but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

Aspects of the present disclosure may be implemented and run on a general-purpose computer or special-purpose computer system. The computer system may be any type known or will be known systems and may include a hardware processor, memory device, a storage device, input/output devices, internal buses, and/or a communications interface for communicating with other computer systems in conjunction with communication hardware and software, etc.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "computer system" and "network" as may be used in the present application may include a variety of combinations of fixed and/or portable computer hardware, software, peripherals, mobile, and storage devices. The computer system may include a plurality of individual components that are networked or otherwise linked to perform collaboratively, or may include one or more stand-alone components. The hardware and software components of the computer system of the present application may include and may be included within fixed and portable devices such as mobile phone, tablet, smartphone, desktop, laptop, and/or server. A module may be a component of a device, software, program, or system that implements some "functionality", which can be embodied as software, hardware, firmware, electronic circuitry, or etc.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually. For example, multiple processors may allow load balancing. As used herein, the term "processor" may be replaced with the term "circuit". The term "processor" may refer to, be part of, or include processor hardware (shared, dedicated, or group) that executes code and memory hardware (shared, dedicated, or group) that stores code executed by the processor.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for authenticating messages transmitted through a public network between devices of a power grid, the system comprising:
   a first device of the power grid, the first device comprising a first processor and a first memory, the first memory operatively connected to the first processor, the first memory configured to store a plurality of shared quantum-based secret keys received from a quantum key distribution (QKD) system and a plurality of values generated from quantum-based random numbers from a quantum-random number generator (QRND), respectively;
   a second device of the power grid spatially separated from, and communicatively coupled through the public network with, the first device, the second device comprising a second processor and a second memory, the second memory operatively connected to the second processor, the second memory configured to store a plurality of shared quantum-based secret keys received from the QKD system;
   wherein the first processor of the first device is configured to:
     select one of the plurality of values and produce an initialization vector from the selected quantum-based random number for a specific transmission;
     obtain at least one unencrypted message for transmission over the public network;
     select one of the plurality of stored shared quantum-based secret keys from the first memory and produce a sender challenge using the at least one unencrypted message, the selected quantum-based key and the produced initialization vector; and
     cause the transmission, over the public network, of a packet containing a payload that includes the at least one unencrypted message, the initialization vector, and the sender challenge, and
   wherein the second processor of the second device is configured to:
     receive, over the public network, the packet transmitted by the first device;
     produce a receiver challenge using the at least one unencrypted message and the initialization vector received in the payload, and a corresponding quantum-based secret key from among the stored shared quantum-based secret keys in the memory of the second device;
     verify whether the receiver challenge matches the sender challenge received in the payload, and if so indicate that the at least one unencrypted message received in the payload is authentic.

2. The system of claim 1, further comprising:
   the QKD system, a part of which is co-located with the first device and a part of which is co-located with the second device, wherein the QKD system is configured to produce a plurality of quantum-based secret keys and share the plurality of quantum-based secret keys with the first device and the second device via a quantum channel.

3. The system of claim 2, wherein the produced quantum-based secret keys comprise a first set of quantum-based secret keys and a second set of quantum-based secret keys, wherein the first set of quantum-based secret keys is used by the first device for transmission and the second set of quantum-based secret keys is used by the second device for transmission.

4. The system of claim 1, further comprising:
   the QRNG, a part of which is co-located with the first device, the QRNG is configured to generate the quantum-based random numbers for the first device.

5. The system of claim 1, wherein a different shared quantum-based secret key and/or a different initialization vector is used for each transmission of the packet.

6. The system of claim 1, wherein the at least one unencrypted message comprises a plurality of unencrypted messages which are collectively transmitted.

7. The system of claim 6, wherein the plurality of encrypted message has a same topic.

8. The system of claim 1, wherein the payload includes an identifier of the selected quantum-based secret key, wherein the second processor of the second device selects the corresponding quantum-based secret key from the second memory in the second device using the identifier in the payload.

9. The system of claim 1, further comprising a server configured to periodically receive from each of the first device and the second device at least one of a number of available quantum-based secret keys, a number of used quantum-based secret keys or a number of newly added quantum-based secret keys.

10. The system of claim 9, wherein the server is configured to further periodically receive from the second device at least one of a number of successful authentications or a number of unsuccessful authentications.

11. The system of claim 10, wherein the server comprises a display configured to display the at least one of a number of successful authentications or a number of unsuccessful authentications and the at least one of a number of available quantum-based random numbers, a number of used quantum-based random numbers or a number of newly added quantum-based random numbers.

12. The system of claim 9, wherein when the number of available quantum-based random numbers in either the first device or the second device is below a threshold, the QKD system produces new quantum-based secret keys and shares the new quantum-based secret keys.

13. The system of claim 11, wherein when a number of unsuccessful authentications exceeds a threshold, an investigation is triggered.

14. The system of claim 1, wherein the payload further comprises a timestamp and the second processor of the second device is further configured to determine whether the payload is timely received at least based on the timestamp, wherein when the payload is not timely received, an investigation is triggered.

15. The system of claim 1, wherein the first processor of first device and the second processor of the second device are configured to generate a message authentication code to
produce the sender challenge, and
produce the receiver challenge and verify whether the receiver challenge matches the sender challenge.

16. The system of claim 1, wherein for a power grid that has two or more distributed energy resources (DERs) that communicate over a first private network and two or more DERs that communicate over a second private network,
the first device is a first network encryption (NE) card and is part of the first private network, wherein the first NE card has the first processor, where the first processor is configured to:
receive over the first private network a message from a DER of the first private network, and produce the payload from the message for authentication; and
cause the transmission of the packet containing the payload over the public network to the second device,
the second device is a second NE card and is part of the second private network, the second NE card has the second processor, where the second processor is configured to:
receive the packet containing the payload over the public network from the first device,
authenticate the payload; and
cause the transmission of the message, over the second private network to at least one DER or an administration device.

17. The system of claim 16, wherein the DERs that are part of the first private network are selected from a group consisting of electrical energy storage modules and photovoltaic (PV) modules and associated controller, respectively and a supervisory control and data acquisition (SCADA) controller.

18. The system of claim 1, wherein
the first processor of the first device is configured to:
generate the unencrypted message for the second device, and
cause the transmission of the packet over the public network to the second device, and
the second processor of the second device is configured to:
receive the packet over the public network from the first device.

19. The system of claim 1, wherein the first device and the second device each is communicatively coupled through the public network to a broker system that implements a publish-subscribe message transmission technique,
the first processor of the first device is configured to:
generate the unencrypted message and associate it with a topic, and
cause the transmission of the packet over the public network to the broker system for topic-based publication, and
the second processor of the second device is configured to:
receive the packet from the broker system over the public network.

20. The system of claim 19, wherein each of the first device and the second device is configured to implement, in conjunction with the broker system, the publish-subscribe message transmission technique using a message queuing telemetry transport (MQTT) protocol.

21. A system for authenticating messages transmitted through a public network between devices of a power grid, the system comprising:
a first device of the power grid configured to access at least one quantum-based secret key produced by a quantum key distribution (QKD) system, the first device comprising a first processor communicatively coupled with the public network via a first communication interface;
a second device of the power grid spatially separated from, and communicatively coupled through the public network with, the first device, the second device configured to access the at least one quantum-based secret key produced by the QKD system, the second device comprising a second processor communicatively coupled with the public network via a second communication interface; and
a quantum random number generator (QRNG) subsystem collocated, at least in part, with the first device, the QRNG subsystem configured to generate at least one quantum-based random number for the first device,
wherein the first processor of the first device is configured to:
obtain an unencrypted message for transmission over the public network;
produce an initialization vector for the transmission from one of the at least one quantum-based random number;
produce a sender challenge using the unencrypted message, one of the at least one quantum-based secret key, and the produced initialization vector; and cause the transmission of, over the public network, a packet containing a payload that includes the unencrypted message, the initialization vector, and the sender challenge, and wherein the second processor of the second device is configured to:

receive, over the public network, the packet transmitted by the first device;

produce a receiver challenge using the unencrypted message and the initialization vector received in the payload, and a corresponding quantum-based secret key from among the at least one accessed quantum-based secret key;

verify whether the receiver challenge matches the sender challenge received in the payload, and if so indicate that the unencrypted message received in the payload is authentic.

22. The system of claim 21, further comprising:

the QKD system, a part of which is collocated with the first device and another part of which is collocated with the second device, wherein the QKD system configured to:

produce the at least one quantum-based secret key, and share the at least one quantum-based secret key with the first device and the second device via a quantum channel.

23. The system of claim 22, wherein the at least one quantum-based secret keys comprises a plurality of quantum-based secret keys, the plurality of quantum-based secret keys comprises a first set of quantum-based secret keys and a second set of quantum-based secret keys, the first set of quantum-based secret keys is to be used by the first device for transmission, and the second set of quantum-based secret keys is to be used by the second device for transmission.

24. The system of claim 23, wherein a different quantum-based secret key and/or a different initialization vector is used for each transmission of a packet.

25. The system of claim 23, wherein the payload includes an identifier of the quantum-based secret key, and the second device is configured to identify the corresponding quantum-based secret key using the identifier in the payload.

26. The system of claim 21, further comprising:

a server configured to periodically receive from each of the first device and the second device at least one of a number of available quantum-based secret keys, a number of used quantum-based secret keys, or a number of newly accessed quantum-based secret keys.

27. The system of claim 26, wherein, when the number of available quantum-based random numbers in either the first device or the second device is below a threshold, the QKD system is configured to:

produce at least one new quantum-based secret key, and share the at least one new quantum-based secret key.

28. The system of claim 26, wherein the server is configured to:

periodically receive from the second device at least one of a number of successful authentication or a number of unsuccessful authentications.

29. The system of claim 28, wherein the server comprises a display configured to display the at least one of a number of successful authentications or a number of unsuccessful authentications, and the at least one of a number of available quantum-based random numbers, a number of used quantum-based random numbers or a number of newly generated quantum-based random numbers.

30. The system of claim 29, wherein when the number of unsuccessful authentications exceeds a threshold, the server is configured to trigger an investigation, or an investigation is triggered.

31. The system of claim 21, wherein the payload further comprises a timestamp, and the second processor of the second device is configured to:

determine whether the payload is timely received at least based on the timestamp, and if not so trigger an investigation.

32. The system of claim 21, wherein the first processor of the first device and the second processor of the second device are configured to generate a message authentication code to produce the sender challenge, and produce the receiver challenge and verify whether the receiver challenge matches the sender challenge.

33. The system of claim 21, wherein, for a power grid that has two or more distributed energy resources (DERs) that communicate over a first private network and two or more DERs that communicate over a second private network, the first device is a first network encryption (NE) card and is part of the first private network, the first NE card has the first processor, where the first processor is configured to:

receive over the first private network a message from a DER of the first private network, and produce the payload from the message for authentication; and cause the transmission of the packet containing the payload over the public network to the second device, and the second device is a second NE card and is part of the second private network, the second NE card has the second processor and where the second processor is configured to:

receive the packet containing the payload over the public network from the first device;

authenticate the payload; and cause the transmission of the message, over the second private network, to at least a DER or an administration device.

34. The system of claim 33, wherein the DERs that are part of the first private network are selected from a group consisting of electrical energy storage modules and photovoltaic modules and associated controller, respectively and a supervisory control and data acquisition (SCADA) controller.

35. The system of claim 21, wherein the first processor of the first device is configured to:

generate the unencrypted message for the second device, and cause the transmission of the packet over the public network to the second device, and the second processor of the second device is configured to:

receive the packet over the public network from the first device.

36. The system of claim 21, wherein the first device and the second device each is communicatively coupled through the public network to a broker system that implements a publish-subscribe message transmission technique, the first processor of the first device is configured to:
  generate the unencrypted message and associate it with a topic, and
  cause the transmission of the packet over the public network to the broker system for topic-based publication, and
the second processor of the second device is configured to:
  receive the packet from the broker system over the public network.

37. The system of claim 36, wherein each of the first device and the second device is configured to implement, in conjunction with the broker system, the publish-subscribe message transmission technique using a message queuing telemetry transport (MQTT) protocol.

\* \* \* \* \*